(12) United States Patent
Zhao et al.

(10) Patent No.: US 12,368,778 B2
(45) Date of Patent: Jul. 22, 2025

(54) METHOD, APPARATUS, ELECTRONIC DEVICE AND STORAGE MEDIUM FOR CREATING ACTION RESOURCES

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Junjie Zhao, Beijing (CN); Jing Su, Beijing (CN); Qian Zhang, Beijing (CN); Yanqiu Zhao, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 493 days.

(21) Appl. No.: 17/611,214

(22) PCT Filed: May 14, 2020

(86) PCT No.: PCT/CN2020/090190
§ 371 (c)(1),
(2) Date: Nov. 15, 2021

(87) PCT Pub. No.: WO2020/233488
PCT Pub. Date: Nov. 26, 2020

(65) Prior Publication Data
US 2022/0229702 A1    Jul. 21, 2022

(30) Foreign Application Priority Data
May 20, 2019   (CN) .......................... 201910420257.5

(51) Int. Cl.
*H04L 67/12*   (2022.01)
*G06F 9/50*    (2006.01)
*G16Y 40/35*   (2020.01)

(52) U.S. Cl.
CPC ............ *H04L 67/12* (2013.01); *G06F 9/5038* (2013.01); *G16Y 40/35* (2020.01)

(58) Field of Classification Search
None
See application file for complete search history.

(56) References Cited

U.S. PATENT DOCUMENTS

| | | | |
|---|---|---|---|
| 10,219,202 B1 * | 2/2019 | Malasani | ................ H04W 4/30 |
| 2012/0011233 A1 * | 1/2012 | Dixon | .................. H04L 12/2827 |
| | | | 709/221 |

(Continued)

FOREIGN PATENT DOCUMENTS

| | | |
|---|---|---|
| CN | 105807728 A | 7/2016 |
| CN | 105843057 A | 8/2016 |

(Continued)

OTHER PUBLICATIONS

T. Perumal, M. N. Sulaiman, S. K. Datta, T. Ramachandran and C. Y. Leong, "Rule-based conflict resolution framework for Internet of Things device management in smart home environment," 2016 IEEE 5th Global Conference on Consumer Electronics, Kyoto, Japan, 2016, pp. 1-2. (Year: 2016).*

(Continued)

*Primary Examiner* — Frank D Mills
(74) *Attorney, Agent, or Firm* — Chiwin Law LLC

(57) ABSTRACT

A method, an apparatus, an electronic device, and a storage medium for creating action resources are disclosed. The method for creating action resources includes: receiving a creation request for a first action resource, wherein the creation request includes a first target resource and a first criterion, the first criterion being used to trigger a first operation for the first target resource according to a first condition; creating the first action resource according to the first criterion and the first target resource; and creating a second action resource, wherein the second action resource (Continued)

includes the first target resource and a second criterion, the second criterion being used to trigger a second operation for the first target resource according to a second condition, and wherein the second operation is different from the first operation.

13 Claims, 12 Drawing Sheets

(56) References Cited

U.S. PATENT DOCUMENTS

| | | | | |
|---|---|---|---|---|
| 2015/0350031 | A1* | 12/2015 | Burks | G06F 3/04842 715/736 |
| 2016/0112341 | A1 | 4/2016 | Lui et al. | |
| 2016/0139575 | A1* | 5/2016 | Funes | G05B 15/02 |
| 2016/0266557 | A1* | 9/2016 | Zhang | G05B 15/02 |
| 2017/0134233 | A1* | 5/2017 | Dong | H04L 47/19 |
| 2017/0261954 | A1* | 9/2017 | Li | G05B 19/042 |
| 2018/0030780 | A1* | 2/2018 | Barnett | E06B 9/364 |
| 2022/0070016 | A1* | 3/2022 | Dai | H04L 12/2818 |

FOREIGN PATENT DOCUMENTS

| | | |
|---|---|---|
| CN | 106027343 A | 10/2016 |
| CN | 106597866 A | 4/2017 |
| CN | 106814629 A | 6/2017 |
| CN | 109634251 A | 4/2019 |
| WO | 2018129956 A1 | 7/2018 |

OTHER PUBLICATIONS

3GPP, "3rd Generation Partnership Project: Technical Specification Group Services and System Aspects; Service Requirement for Machine-Type Communications, Stage 1 (Release 13)" Dec. 31, 2016; 3GPP TS 22.368 V13.2.0 (Dec. 2016).

* cited by examiner

METHOD, APPARATUS, ELECTRONIC DEVICE AND STORAGE MEDIUM FOR CREATING ACTION RESOURCES

CROSS REFERENCE TO RELATED APPLICATIONS

This application is a U.S. National Phase Entry of International Application No. PCT/CN2020/090190, filed on May 14, 2020, designating the United States of America and claiming priority to Chinese Patent Application No. 201910420257.5, filed on May 20, 2019. The present application claims priority to and the benefit of the above-identified applications and the above-identified applications are incorporated by reference herein in their entirety.

TECHNICAL FIELD

The present disclosure relates to a field of Internet of Things, and in particular, to a method, an apparatus, an electronic device, and a storage medium for creating action resources.

BACKGROUND

In an Internet of Things system, an application entity as an application program may deploy services on a common service entity as a service platform. After the service is deployed on the service platform, the application program may realize operations of the service directly on the service platform without participating in a process of realizing the service. For example, the service platform may provide common service functions for a plurality of different application programs.

SUMMARY OF THE DISCLOSURE

To this end, the present disclosure provides a method, an apparatus, an electronic device, and a storage medium for creating action resources.

According to one aspect of the present disclosure, a method for creating action resources is provided, comprising: receiving a creation request for a first action resource, wherein the creation request includes a first target resource and a first criterion, the first criterion being used to trigger a first operation for the first target resource according to a first condition; creating the first action resource according to the first criterion and the first target resource; and creating a second action resource, wherein the second action resource includes the first target resource and a second criterion, the second criterion being used to trigger a second operation for the first target resource according to a second condition, and wherein the second operation is different from the first operation.

In some embodiments, the first condition and the second condition are different.

In some embodiments, the first condition is that a value of an environment variable is greater than a first threshold, and the second condition is that the value of the environment variable is less than or equal to the first threshold.

In some embodiments, the first condition is that a value of an environment variable is greater than a first threshold, and the second condition is that the value of the environment variable is less than or equal to a second threshold, wherein the second threshold is less than the first threshold.

In some embodiments, the creating a second action resource includes: creating the second action resource in a case that there is no action resource for the first target resource before the first action resource is created.

In some embodiments, the creating a second action resource includes: creating the second action resource in a case that there is no action resource that triggers the second operation for the first target resource before the first action resource is created.

In some embodiments, the second operation is a reverse of the first operation.

In some embodiments, the first criterion is further used to trigger a third operation for the second target resource according to the first condition.

In some embodiments, the third operation is an auxiliary operation of the first operation.

In some embodiments, the second criterion is further used to trigger a fourth operation for the second target resource according to the second condition, wherein the fourth operation is a reverse of the third operation.

In some embodiments, the first action resource further includes a dependency condition for the first action resource, and wherein the first criterion is further used to perform the third operation for the second target resource in a case that both the first condition and the dependency condition are satisfied.

In some embodiments, the first action resource further includes a dependency condition for the first action resource, wherein the first criterion is further used to perform the first operation for the first target resource in a case that both the first condition and the dependency condition are satisfied, and wherein, the creating a second action resource includes: determining a second target resource associated with the dependency condition, and determining a third action resource based on the second target resource, the third action resource being used to perform a fifth operation for the second target resource in a case that a third condition is satisfied; creating the second action resource based on the third condition, wherein the third condition is determined as a dependency condition of the second condition.

According to another aspect of the present disclosure, an apparatus for creating action resources is provided, comprising: a receiving unit, configured to receive a creation request for a first action resource, wherein the creation request includes a first target resource and a first criterion, the first criterion being used to trigger a first operation for the first target resource according to a first condition; a first creating unit, configured to create the first action resource according to the first criterion and the first target resource; and a second creating unit, configured to create a second action resource, wherein the second action resource includes the first target resource and a second criterion, the second criterion being used to trigger a second operation for the first target resource according to a second condition, and wherein the second operation is different from the first operation.

In some embodiments, the first condition and the second condition are different.

In some embodiments, the first condition is that a value of an environment variable is greater than a first threshold, and the second condition is that the value of the environment variable is less than or equal to the first threshold.

In some embodiments, the first condition is that a value of an environment variable is greater than a first threshold, and the second condition is that the value of the environment variable is less than or equal to a second threshold, wherein the second threshold is less than the first threshold.

In some embodiments, the second creating unit is further configured to create the second action resource in a case that there is no action resource for the first target resource before the first action resource is created.

In some embodiments, the second creating unit is further configured to create the second action resource in a case that there is no action resource that triggers the second operation for the first target resource before the first action resource is created.

In some embodiments, the second operation is a reverse of the first operation.

In some embodiments, the first criterion is further used to trigger a third operation for the second target resource according to the first condition.

In some embodiments, the third operation is an auxiliary operation of the first operation.

In some embodiments, the second criterion is further used to trigger a fourth operation for the second target resource according to the second condition, wherein the fourth operation is a reverse of the third operation.

In some embodiments, the first action resource further includes a dependency condition for the first action resource, wherein the first criterion is further used to perform the third operation for the second target resource in a case that both the first condition and the dependency condition are satisfied.

In some embodiments, the first action resource further includes a dependency condition for the first action resource, wherein the first criterion is further used to perform the first operation for the first target resource in a case that both the first condition and the dependency condition are satisfied, and wherein, the second creating unit is further configured to: determine a second target resource associated with the dependency condition, and determine a third action resource based on the second target resource, the third action resource being used to perform a fifth operation for the second target resource in a case that a third condition is satisfied, and create the second action resource based on the third condition, wherein the third condition is determined as a dependency condition of the second condition.

According to yet another aspect of the present disclosure, an electronic device is further provided, the electronic device including a memory and a processor, wherein the memory has instructions stored thereon, which, when performed by the processor, cause the processor to perform the method as previously described.

According to yet another aspect of the present disclosure, a computer-readable storage medium having instructions stored thereon is further provided, which, when performed by a processor, cause the processor to perform the method for detecting a target as previously described.

BRIEF DESCRIPTION OF THE DRAWINGS

In order to illustrate technical solutions of embodiments of the present disclosure more clearly, accompanying drawings used for description of the embodiments will be briefly described below. Obviously, the accompanying drawings in the following description are only some embodiments of the present disclosure. For those of ordinary skill in the art, other accompanying drawings may be obtained from these accompanying drawings without creative work. The following accompanying drawings are not deliberately scaled and drawn in proportion to the actual size, but focus on illustrating the gist of the present disclosure.

DESCRIPTION OF THE EMBODIMENTS

In order to make objectives, technical solutions, and advantages of the present disclosure clearer, the following embodiments are used to further illustrate the present disclosure in detail. Obviously, the described embodiments are only a part of the embodiments of the present disclosure, rather than all the embodiments. Based on the embodiments in the present disclosure, all other embodiments obtained by those of ordinary skill in the art without creative work fall within the protection scope of the present disclosure.

With the development of information technology, especially Internet technology, the Internet of Things technology used to realize informatization, remote management and control, and intelligent networks is gradually maturing. The Internet of Things uses communication technologies such as local networks or the Internet to connect sensors, controllers, machines, people, and things together in a new way, to form connections between people and things, or things and things. The Internet of Things is an extension of the Internet, includes the Internet and all resources on the Internet, and is compatible with all applications of the Internet. With applications of the Internet of Things technology in various fields, various new application fields such as smart home, smart transportation, smart health and the like have emerged.

Figure 1:
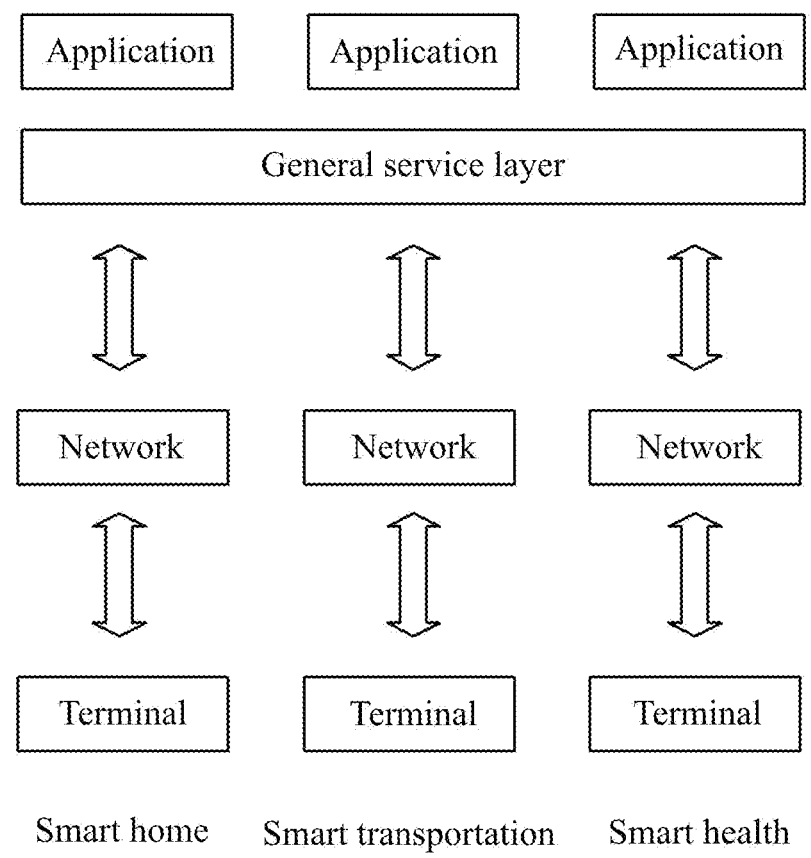
FIG. 1 discloses a schematic architecture diagram of the Internet of Things according to the present disclosure.

FIG. 1 discloses a schematic architecture diagram of the Internet of Things according to the present disclosure. As shown in FIG. 1, various client devices serving as terminals access the network, and access a common service layer through the network, while the common service layer supports various applications, thus a terminal+network+application architecture is formed. For example, in the field of smart home, the terminals may be various household devices. The household devices may access a common service platform by using a local area network (LAN), and such LAN access may be wireless or wired, for example. Optionally, the local area network may be a personal area network (PAN). For example, taking a wireless personal area network (WPAN) as an example, various technologies such as Bluetooth, IrDA, Home RF, ZigBee, or UWB (Ultra-Wideband Radio) may be used to achieve the access.

As mentioned above, when an Internet of Things entity (for example, a software module in an Internet of Things terminal device, or a software module in a node device) transmits data or information to the common service entity, the data or information may be stored as separate resources. In addition, the Internet of Things entity may transmit a request to the common service entity, so as to update the resources stored on the common service entity corresponding to the Internet of Things entity, thereby reflecting a status of the device on which the Internet of Things entity is operated. Update may be performed in real time or periodically, or may be triggered by a certain condition. Therefore, other Internet of Things entities communicating with the common service entity may learn the status of the device corresponding to the Internet of Things entity by accessing the updated resources; or, other Internet of Things entities communicating with the common service entity may perform operations on the updated resources. It should be noted that the resources referred to herein include resources of various entities (for example, which may be embodied as software modules in Internet of Things devices, such as AE, CSE and other entities). An entity may represent a software module of a communication device, while a common service entity may represent a software module of a service platform, and the service platform may be local or remote. Optionally, performing operations on the updated resources includes, for example, obtaining information of the updated resources, deleting the information of the updated resources, notifying the information of the updated resources to a third party, or performing operations on other resources based on the information of the updated resources.

In the present disclosure, the described entities (for example, the application entity AE and the common service entity CSE), data and the like may be represented by resources. A resource may have a unique identifier, and includes attributes and sub-resources, where the attributes are used to store resource-related information, and the sub-resources are next-level resources of the resource, and the resource includes indexes pointing to the sub-resources.

Taking smart home as an example, Table 1 shows examples of possible actions in the Internet of Things environment.

TABLE 1

| Trigger conditions | Operations | Target objects |
|---|---|---|
| A door is opened | Turn on | Camera |
| At night | Turn off | Headlight in sleeping room Lamplet |
| | Light up | |
| Fall asleep | Turn off | Lamplet |
| Get up during sleep | Turn on | Lamplet |
| Lying in bed during sleep | Turn off | Lamplet |
| After a deep sleep | Turn up | Air conditioner |
| Sunny day | Open | Window |
| Cloudy, rainy or snowy days | Close | Window |

TABLE 1-continued

| Trigger conditions | Operations | Target objects |
|---|---|---|
| Gas leakage | Open | Window |
| Human body sensor | Turn on | Night light |
| Smoke alarm | Open | Window |
| Door and window sensor | Turn on | Camera |
| Door and window sensor | Turn on | Corridor light |
| Human body sensor does not detect a person | Turn on | Floor sweeping robot |
| Temperature sensor + human body sensor | Turn on | Air conditioner |
| Position sensor detects someone in a certain range | Turn on | Air conditioner, light, etc. |
| Temperature sensor detects fever | Turn off | Air conditioner |

As shown in Table 1, according to different usage scenarios, a plurality of different action resources may be set for a same target object in different situations. Trigger conditions of action resources set for the same target object by different action resources may be different, and operations set for the target object may be the same or different. Trigger events shown in Table 1 are only schematic examples. In fact, those skilled in the art may set any action trigger events according to the actual situations. In some embodiments, action trigger events may be divided into location events (for example, setting that an event occurs at a certain location), time events (for example, setting that an event occurs at a certain time), operation events (for example, setting that an event is produced by a certain operation) and user events (for example, perception of an existence of a certain user).

For example, as can be seen from Table 1, operations for a lamplet may include turning on and turning off. For example, when it is detected that it is at night or the owner gets up during sleep, the lamplet may be turned on. When it is detected that the owner falls asleep or is lying on the bed during sleep, the lamplet may be turned off. For another example, when a sunny day, a gas leakage or a smoke alarm is detected, the window may be opened. When a cloudy, rainy or snowy day is detected, the window may be closed.

In some embodiments, action resources may also be aimed at a plurality of targets. For example, when a position sensor detects the presence of someone within a certain range, a plurality of target objects (such as air conditioners, lights, etc.) may be controlled to be turned on.

In other embodiments, the action resources may also set a plurality of trigger conditions for operations on the target resources. For example, when a temperature sensor detects that the temperature is higher or lower than a preset temperature threshold, and a human body sensor detects people in the room, the air conditioner may be controlled to be turned on.

As can be seen from Table 1, due to the complex operating environment of the smart home, there may be a plurality of different action resources for a same target object. Therefore, there may be conflicting operation instructions for a same target object. For example, under a rainy weather condition, the server will control the windows to be closed. However, if a smoke alarm detects an excessive amount of smoke in the air at the same time, the server will control the windows to be opened. In this case, if firstly an excessive amount of smoke is detected in the air, the server will control the windows to be opened, and if a rain is detected later, the server will control the windows to be closed instead.

It should be understand that if the smoke alarm detects an excessive amount of smoke in the air, it means that there may be an emergency situation such as a fire in the room. In this case, if the server controls the window to be closed because rain is detected, people in the room may be put in danger.

In addition, if trigger conditions of two different operations for a same target resource are satisfied at the same time, it will be difficult for the server to achieve effective control of the target resource.

Therefore, when a creation request for an action resource is received, other action resources with the same target resource may be determined, among a plurality of resources stored in the server according to the target resource in the action resource, as the action resources for determining a dependency condition. According to trigger conditions involved in the action resources for the same target resource, the dependency condition of the action resource to be created may be determined. For example, the dependency condition of the action resource to be created may be determined according to trigger conditions of other action resources with higher priorities.

In addition, in a complex usage environment such as the smart home, in order to make the user experience better, it is necessary to set a plurality of different action resources for respective application devices, so that the respective application devices may perform appropriate functions in different usage environments. To achieve the above-mentioned effect, the user needs to consider the operations that the application devices should perform in different situations, and set corresponding action resources for such operations on the server. It is conceivable that in the presence of the plurality of application devices, the user's workload is very large.

In order to improve the user experience, the present disclosure provides a method for creating new action resources according to existing action resources, so as to reduce the user's workload for setting action resources in the Internet of Things.

Figure 2:
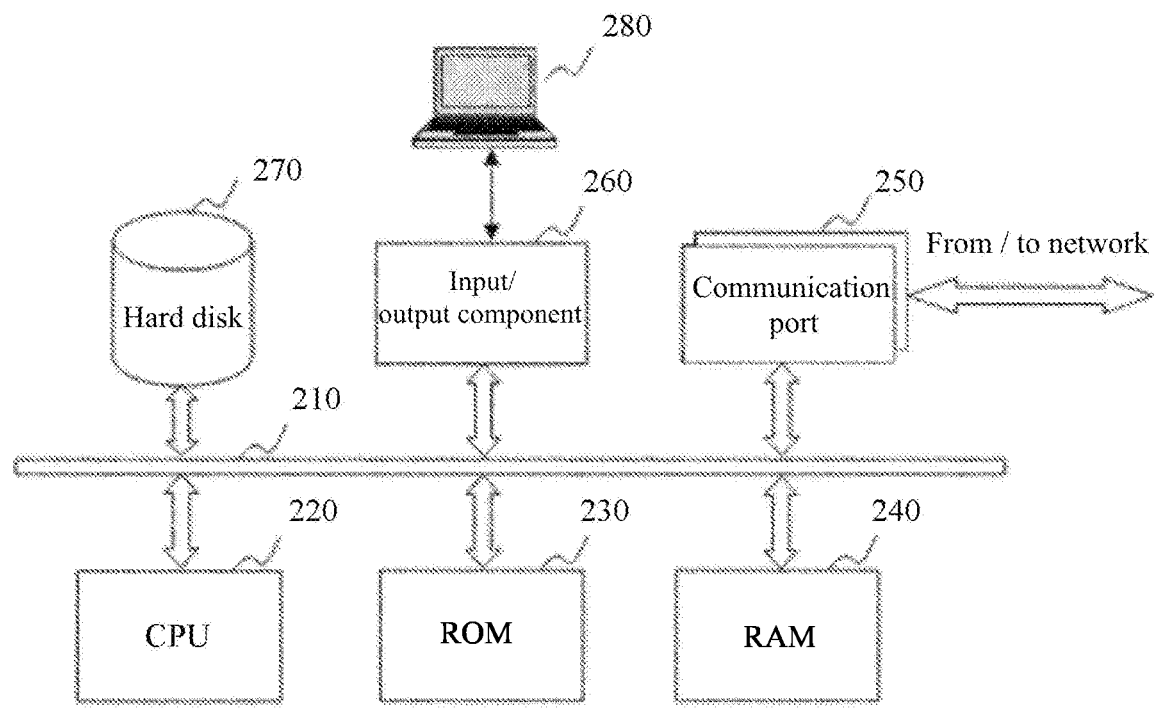
FIG. 2 shows a schematic diagram of a server/client device according to the embodiments of the present disclosure.

FIG. 2 shows a schematic diagram of the server/client device according to the embodiments of the present disclosure. In the Internet of Things system, the server may be used to implement the aforementioned service platform, and the client device may be used to implement the aforementioned terminal device.

FIG. 2 is an architecture of a computer device according to some embodiments of the present disclosure. Such computer device may be used to implement the server device or the client device disclosed in this disclosure. Such computers may include personal computers, laptops, tablets, mobile phones, personal digital assistances (PDAs), smart glasses, smart watches, smart rings, smart helmets, and any smart portable devices or wearable devices. In some embodiments, the architecture of the computing device as shown in FIG. 2 may also be used to implement various smart home terminal devices in the Internet of Things system, such as smart switches, smart gateways, smart rice cookers, smart purifiers, etc. The specific system in this embodiment explains a hardware platform including a user interface by using a functional block diagram. Such computer device may be one general-purpose computer device or one special-purpose computer device, both of which may be used to implement the server device or the client device of the terminal in this embodiment. A computer system 200 may implement any of currently described components that provide information required for Internet of Things communication. For example, the computer system 200 may be implemented by the computer device through its hardware device, software program, firmware, and a combination thereof. For the sake of convenience, only one computer device is drawn in FIG. 2, but the relevant computer functions described in this embodiment to provide information required for Internet of Things communication may be implemented in a distributed manner by a group of similar platforms, thereby distributing the processing load of the system.

The computer system 200 may include a communication port 250, which is connected to a network for data communication. The computer system 200 may further include a processor 220 for performing program instructions. The processor 220 may be composed of at least one processor. The computer 200 may include an internal communication bus 210. The computer 200 may include different forms of program storage units and data storage units, such as a hard disk 270, a read only memory (ROM) 230, and a random access memory (RAM) 240, which may be used to store various data files for computer processing and/or communication, and possible program instructions performed by the processor 220. The computer system 200 may further include an input/output component 260 to support input/output data flow between the computer system 200 and other components (such as a user interface 280). The computer system 200 may also transmit and receive information and data via the communication port 250.

In some embodiments, the above-mentioned computer system 200 may be used to form the server in the Internet of Things communication system. The server of the Internet of Things communication system may be a server hardware device or a server group. Various servers in the server group may be connected through a wired or wireless network. The server group may be centralized, for example, a data center. The server group may also be distributed, for example, a distributed system.

The computing device provided in FIG. 2 may be used to implement a client application entity AE, a client common service entity CSE, a server application entity AE, and/or a server common service entity CSE involved in the present disclosure.

Different aspects of the method for providing information required for data communication of the Internet of Things communication and/or the method for implementing other steps by programs are outlined above. The program part in the technology may be regarded as a "product" or "article" in the form of executable code and/or related data, which participates in or is realized by a computer-readable medium. A tangible, permanent storage medium may include any storage or memory used by computers, processors, similar devices or related modules, for example, various semiconductor memories, tape drives, disk drives, or similar devices that may provide storage functions for software.

Figure 3A:
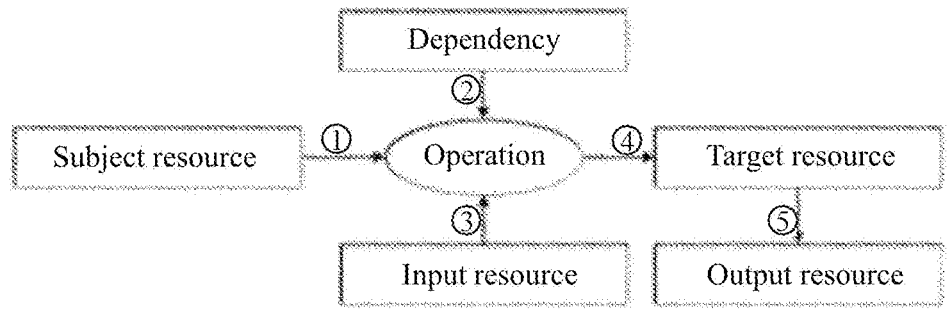
FIG. 3A shows a schematic example of a process of performing action trigger in an Internet of Things platform according to the embodiments of the present disclosure.

FIG. 3A shows a schematic example of a process of performing action trigger in the Internet of Things platform according to the embodiments of the present disclosure.

As shown in FIG. 3A, in step 1, a change of a subject resource and whether the change of the subject resource satisfies a defined trigger condition are detected. When the trigger condition is satisfied, an operation for a target resource is triggered to change a state of the target resource.

In step 2, before performing the operation, whether all dependency conditions have been satisfied may be confirmed.

In step 3, if all dependency conditions have been satisfied, input parameters for the operation may be determined. Such input parameters will be obtained by reading input attributes of action resources.

In step 4, the operation may be transmitted to the target resource. The operation may be any operation such as creation, update, deletion, or notification.

In step 5, after performing the operation for the target resource, the state of the target resource may be changed. For example, on/off for a specific device may be realized.

In the embodiments provided by the present disclosure, taking the operation performed for the window as an example, the server may transmit a notification to a window controller to control opening and closing of the window by using the process as shown in FIG. 3A. For the convenience of description in the following description, the target resource of the action resource may also be considered as the window.

Figure 3B:
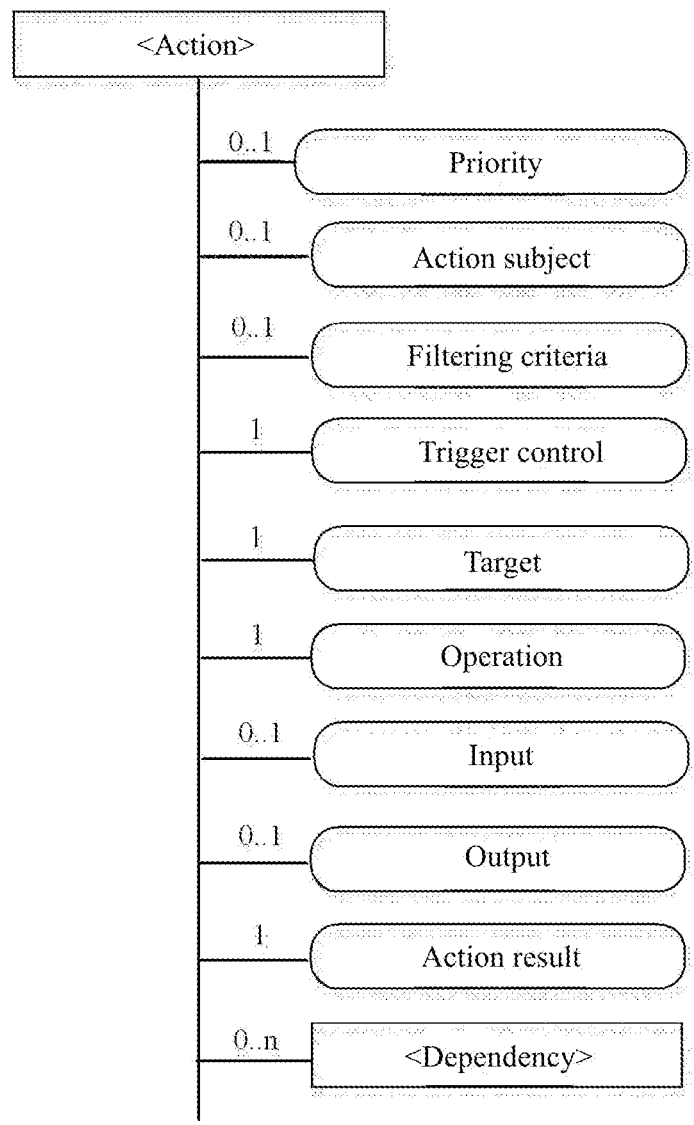
FIG. 3B shows an example of an action resource according to the embodiments of the present application.

FIG. 3B shows an example of an action resource (<action>) according to the embodiments of the present application.

As shown in FIG. 3B, the action resource may include at least one attribute and/or sub-resource. For example, the action resource <action> may include a priority attribute (priority) that indicates a priority of the action resource, a subject resource attribute (actionSubjectResource) that indicates an object to be detected of the action resource, and a filtering criterion attribute (filterCriteria) that indicates an action trigger condition of the action resource, a trigger control attribute (evalControl) that indicates a trigger mode of the action resource, a target attribute (objectResource) that indicates a control target of the action resource, an operation attribute (operation) that indicates an operation mode of the action resource, an input attribute (input) that indicates operation parameters of the operation, an output resource attribute (outputResource) that indicates an operation result of the action resource, an action result attribute (actionResult) that indicates an action result of the action resource, and a dependency sub-resource (<dependency>) that indicates a dependency condition of an action performed by the action resource.

The subject resource attribute of the action resource may be updated in a predefined manner. For example, an application entity registered on the server may transmit information to the server periodically or in response to occurrence of a preset event, to update the subject resource attribute. When the information received from the application entity makes the subject resource of the action resource satisfies an action trigger condition of the action resource, a preset operation may be performed for the target attribute of the action resource. In this document, the subject resource attribute may also be abbreviated as the subject resource.

In some embodiments, the filtering criterion attribute may include at least one trigger condition, and the dependency sub-resource may include at least one dependency condition. The action resource shown in FIG. 3B is used to perform a preset operation, that is, the operation defined in the operation attribute, for the target included in the target attribute when the trigger condition included in the filtering criterion attribute and the dependency condition included in the dependency sub-resource are satisfied.

The number before each attribute and sub-resource shown in FIG. 3B indicates whether the attribute or sub-resource is optional. For example, the number 1 before the target attribute indicates that the target resource attribute is mandatory. In other words, all action resources need to define the target attribute, that is, target objects of actions realized by the action resources. For another example, the number 0 . . . 1 before the priority attribute indicates that the priority attribute is optional. In other words, not all action resources must include the priority attribute. For yet another example, the number 0 . . . n before the dependency sub-resource indicates that the dependency sub-resource is also optional.

Although the present disclosure shows one schematic example of implementing the action resource, those skilled in the art may understand that, depending on the actual situations, the above-mentioned action resource may also be set in other ways.

Figure 4:
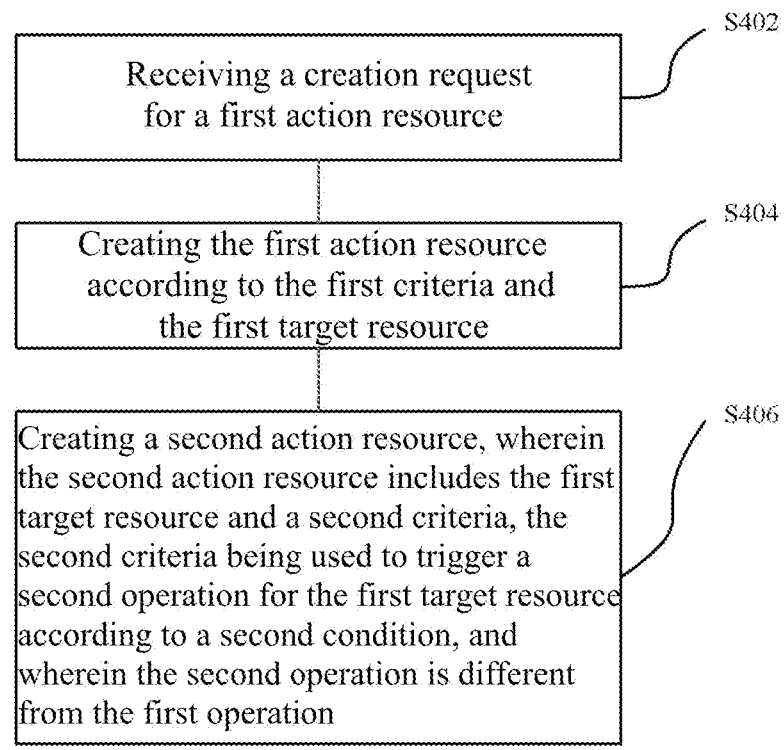
FIG. 4 shows a flowchart of a method for creating action resources performed by a common service entity according to the embodiments of the present disclosure.

FIG. 4 shows a flowchart of a method for creating action resources performed by a common service entity according to the embodiments of the present disclosure. The method 400 shown in FIG. 4 may be performed by the aforementioned common service entity. Taking the usage environment of the smart home as an example, the above-mentioned common service entity may be realized by a home management server, and the application entity may be realized by a home management application device (for example, a human body sensor, a temperature sensor, a door and window sensor, etc.).

As shown in FIG. 4, in step S402, a creation request for a first action resource may be received, where the creation request includes a first target resource and a first criterion, and the first criterion is used to trigger a first operation for the first target resource according to a first condition. The first condition may be that a value of an environment variable is greater than a first threshold. The value of the environment variable may be a parameter value of the surrounding environment detected by the application entity, such as a concentration of carbon monoxide in the air, a haze parameter (such as particle concentration, etc.), temperature, humidity and other parameter values.

The first action resource may be a resource used to implement a first action. For example, when an application program wants to deploy an action on the service platform, it may transmit a creation request for an action resource to the service platform. For example, the home management application may deploy such an action on the home management server: when the concentration of carbon monoxide in the air is detected to be higher than a threshold A, an opening operation is performed for the window. The concentration of carbon monoxide in the air may be detected by a carbon monoxide sensor registered to the service platform, and the opening operation for the window may be performed by a window controller registered to the service platform.

In step S404, the first action resource may be created according to the first criterion and the first target resource. With the created first action resource, it is possible to perform a predefined operation for the first target resource when the trigger condition is satisfied.

In some embodiments, the first criterion is further used to trigger a third operation for a second target resource according to the first condition. That is, the first action resource may include a plurality of target resources, and the predefined operation may be performed for each of the plurality of target resources when the trigger condition is satisfied.

In some embodiments, the first action resource further includes a dependency condition for the first action resource, and the first criterion is also used to perform the third operation for the second target resource in the case that both the first condition and the dependency condition are satisfied. The dependency condition may be determined according to trigger conditions of other action resources for the same second target resource.

In step S406, a second action resource may be created, where the second action resource includes the first target resource and a second criterion, the second criterion is used to trigger a second operation for the first target resource according to a second condition, and the second operation is different from the first operation.

In some embodiments, the second operation may be a reverse of the first operation. For example, when the first operation is to perform an opening operation for the target resource (for example, opening the window, turning on the purifier), the second operation may be to perform a closing operation for the target resource.

In other embodiments, the second operation may also be any other operation different from the first operation. For example, when the first operation is to set the temperature of the air conditioner to 25° C., the second operation may be to set the temperature of the air conditioner to 18° C.

In some embodiments, the second condition may be different from the first condition. When the first condition is that the value of the environment variable is greater than the first threshold, the second condition may be that the value of the environment variable is less than or equal to the first threshold. For example, when the first action resource is used to turn on the purifier when the haze parameter is greater than a threshold C, the second condition may be set as the haze parameter being less than or equal to the threshold C. When the first condition is that the value of the environmental variable is greater than the first threshold, the second condition may also be that the value of the environmental variable is less than or equal to a second threshold, where the second threshold is less than the first threshold. In another example, the second condition may also be set as the haze parameter being less than or equal to a threshold D, where the threshold D is less than or equal to the threshold C. The second action resource may be used to turn off the purifier when the second condition is satisfied.

In some embodiments, in step S406, the second action resource may be created in the case that the common service entity does not include the action resource for the first target resource before the first action resource is created. For example, when the first action resource is used to turn on the purifier in the case that the haze parameter is greater than the threshold C, whether there are other action resources for performing operations for the purifier may be judged. In the case that there are other action resources for performing operations for the purifier before the first action resource is created, the second action resource may not be created. In the case that there is no other action resource for performing operation for the purifier before the first action resource is created, the second action resource may be created.

Further, in step S406, the second action resource may be created in the case that the common service entity does not include the action resource that triggers the second operation for the first target resource before the first action resource is created. For example, when the first action resource is used to turn on the purifier in the case that the haze parameter is greater than the threshold C, whether there are other action resources for performing turning off operation for the purifier may be judged. In the case that there are other action resources for performing operations for the purifier, it is also necessary to further judge whether the other resources for performing operations for the purifier are all action resources for turning on the purifier. If there are only action resources for turning on the purifier, and no other action resource for performing turning off operation for the purifier, a second action resource may be created.

In some embodiments, the third operation performed for the second target resource may be an auxiliary operation of the first operation. In other words, performing the third operation for the second target resource helps the first operation to achieve its due effect. In this case, the second action resource may be created only for the first target resource.

In other embodiments, when the first action resource involves operations for a plurality of target resources, the second action resource may be created to perform other operations that are different from the operations defined in the first action resource for each target resource. For example, the second criterion may further be used to trigger a fourth operation for the second target resource according to the second condition, where the fourth operation is a reverse of the third operation.

In some embodiments, when the first action resource further includes the dependency condition, that is, the first criterion is also used to perform the first operation for the first target resource in the case that both the first condition and the dependency condition are satisfied, step S406 may further include: determining the second target resource associated with the dependency condition, and determining a third action resource based on the second target resource, the third action resource being used to perform a fifth operation for the second target resource in the case that a third condition is satisfied; and creating the second action resource based on the third condition, where the third condition is determined as a dependency condition of the second condition.

That is, in the presence of a dependency condition, new action resources may be created according to action resources involved in target resources related to the dependency condition. The process of creating new action resources in the presence of a dependency condition will be described below in conjunction with FIG. 5E and FIG. 5F, which will not be repeatedly described herein.

Further, in step S406, a priority of the second action resource may be set according to a priority of the first action resource, where the priority of the second action resource may be higher than, equal to, or lower than the priority of the first action resource.

With the method for creating action resources provided in this application, new action resources for the same target resource may be created according to trigger conditions of the created action resources, thereby realizing an intelligent creation of actions for the target resource, reducing the user's workload when setting up an action service of the application device, and improving the user's experience.

Figure 5A:
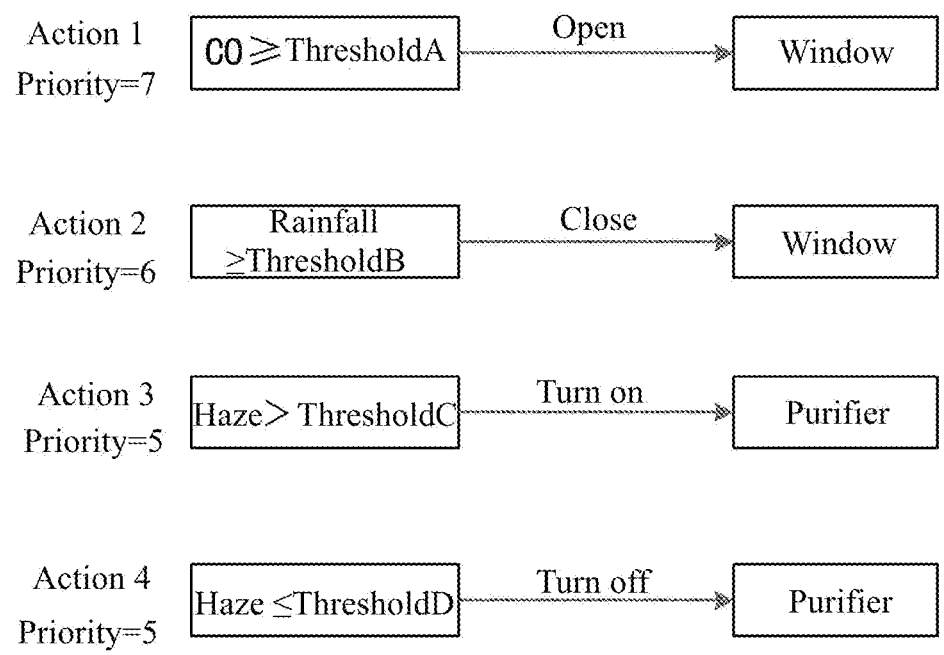
FIG. 5A shows a schematic example of creating action resources according to the embodiments of the present disclosure.

FIG. 5A shows a schematic example of creating action resources according to the embodiments of the present disclosure. As shown in FIG. 5A, action 1 and action 2 already exist in the server. The priority of action 1 is set to 7, which may be used to open the window when the concentration of carbon monoxide (CO) is greater than or equal to the threshold A. The priority of action 2 is set to 7, which may be used to close the window when the rainfall is greater than the threshold B.

Then, the server may receive a creation request for action resource for action 3, where action 3 may be used to turn on the purifier when the haze parameter is greater than the threshold C. After creating the action resource for action 3, it may be determined that there is no other action resource for performing operation for the purifier in the current server. When the purifier is turned on, there is no other action resource capable of controlling the purifier.

In order to increase the control for the purifier, an action resource for action 4 related to action 3 may be created according to the action resource for action 3 that has been created. In some cases, action 4 may be referred to as an accompanying action of action 3.

As shown in FIG. 5A, action 4 may be used to turn off the purifier when the haze parameter is less than or equal to the threshold D (where the threshold D is less than or equal to the threshold C).

Figure 5B:
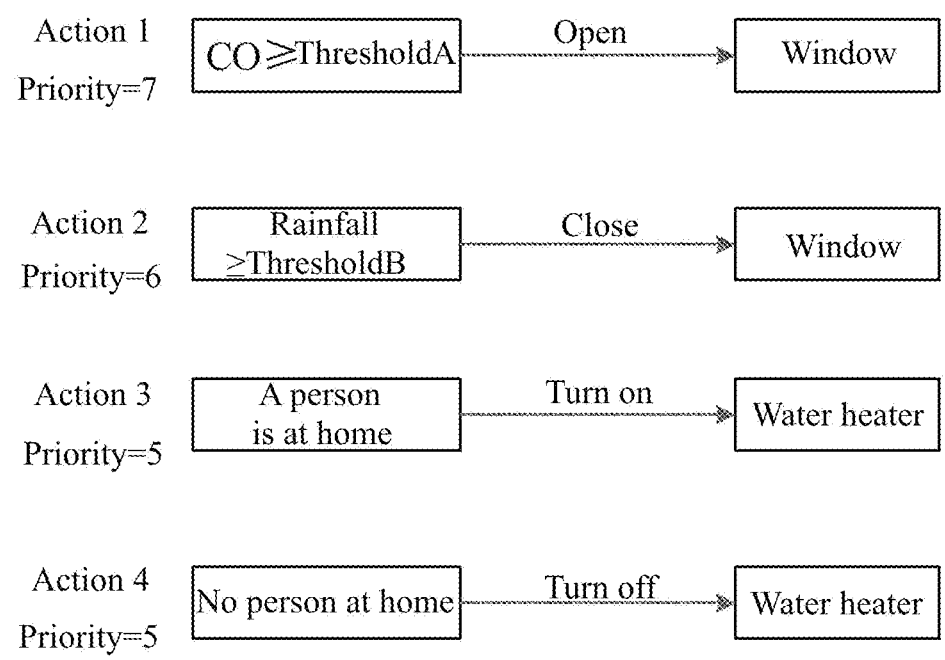
FIG. 5B shows another schematic example of creating action resources according to the embodiments of the present disclosure.

FIG. 5B shows another schematic example of creating action resources according to the embodiments of the present disclosure. Action resources for action 1 and action 2 shown in FIG. 5B are the same as the action resources for action 1 and action 2 shown in FIG. 5A, which will not be repeatedly described herein.

As shown in FIG. 5B, action 3 may be used to turn on the water heater if a person is detected at home. Since there is no other action resource for controlling the water heater in the server, an action resource for an accompanying action of action 3, that is, an action resource for action 4, may be created according to the action 3 that has been created. Action 4 may be used to turn off the water heater if no person is detected at home.

Figure 5C:
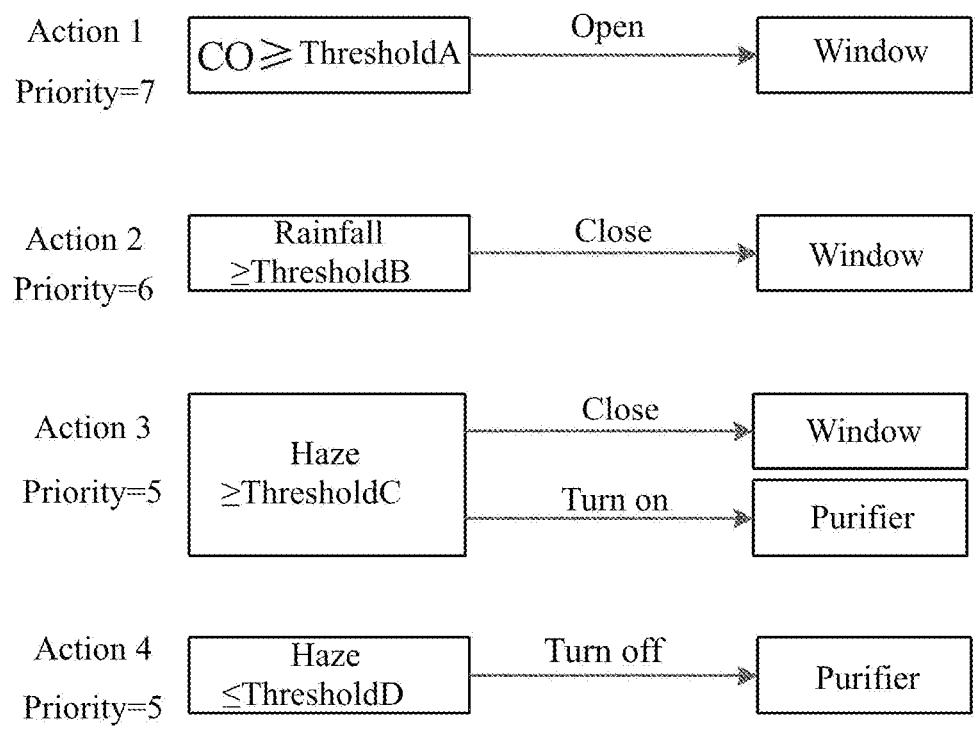
FIG. 5C shows yet another schematic example of creating action resources according to the embodiments of the present disclosure.

FIG. 5C shows another schematic example of creating action resources according to the embodiments of the present disclosure. Action resources for action 1 and action 2 shown in FIG. 5C are the same as the action resources for action 1 and action 2 shown in FIG. 5A, which will not be repeatedly described herein.

As shown in FIG. 5C, action 3 may be used to close the window and turn on the purifier when it is detected that the haze parameter is greater than the threshold C.

It should be understand that there is an association relationship between operations for two different targets involved in action 3. In fact, the purpose of action 3 is to turn on the purifier, thereby reducing the impact of haze on the environment. In order to improve the usage effect of the purifier, action 3 also performs the closing operation for the window at the same time, so that the purifier has a better working effect. Therefore, the turning on operation for the purifier is the main operation of action 3, and the closing operation for the window is an auxiliary operation to the turning on operation of the purifier.

Therefore, in this case, an action resource for an accompanying operation may be created only for the main operation of action 3. For example, as shown in FIG. 5C, an accompanying action resource for action 4 may be created, where when the haze parameter is less than or equal to the threshold D (the threshold D is less than or equal to the threshold C), the turning off operation may be performed for the purifier.

Figure 5D:
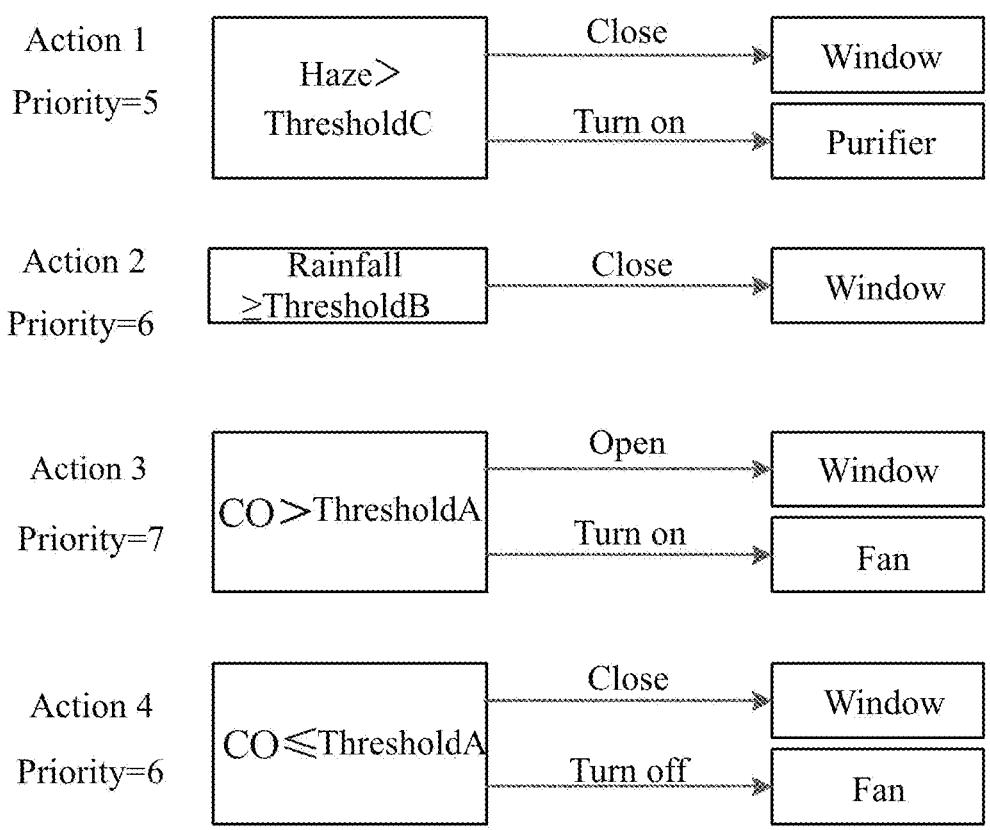
FIG. 5D shows yet another schematic example of creating action resources according to the embodiments of the present disclosure.

FIG. 5D shows yet another schematic example of creating action resources according to the embodiments of the present disclosure. Action resources for action 1 and action 2 shown in FIG. 5D are the same as the action resources for action 1 and action 2 shown in FIG. 5A, which will not be repeatedly described herein.

As shown in FIG. 5D, action 3 may be used to perform an operation of opening the window and an operation of turning on a fan when it is detected that the carbon monoxide content is greater than the threshold A. It can be seen that when operations for a plurality of target resources targeted by an action are all for a same purpose, a relationship of the operations for the plurality of target resources is parallel. In this case, another action resource that performs other operations for each target resource may be created.

For example, as shown in FIG. 5D, an action resource for accompanying operations may be created for all operations of action 3. In FIG. 5D, the accompanying action resource may be action 4. Action 4 may be used to perform an operation of closing the window and perform an operation of turning off the fan when the carbon monoxide content is less than or equal to the threshold A.

In addition, in the case that a priority of action 3 is set to 7, a priority of action 4 may be set to 6. Those skilled in the art may understand that, without departing from the principles of the present disclosure, a priority of an accompanying action resource may be set to be higher, the same or lower than that of the original action resource according to the actual situation.

Figure 5E:
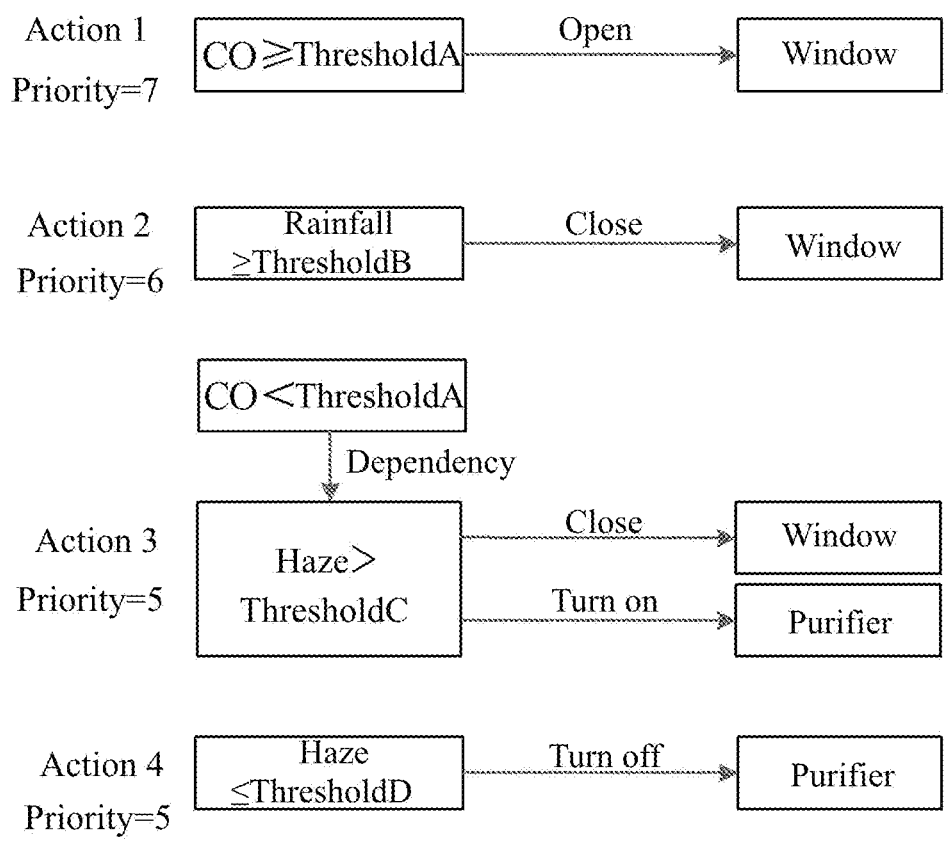
FIG. 5E shows yet another schematic example of creating action resources according to the embodiments of the present disclosure.

FIG. 5E shows yet another schematic example of creating action resources according to the embodiments of the present disclosure. Action resources for action 1 and action 2 shown in FIG. 5E are the same as the action resources for action 1 and action 2 shown in FIG. 5A, which will not be repeatedly described herein.

As shown in FIG. 5E, action 3 may be used to close the window and turn on the purifier when the haze parameter is greater than the threshold C. In addition, action 3 also has a dependency condition. That is, only if the trigger condition (the haze parameter is greater than the threshold C) and the dependency condition (the carbon monoxide content is less than or equal to the threshold A) are satisfied at the same time, action 3 performs the closing operation for the window and the turning on operation for the purifier. The dependency condition of action 3 may be generated according to the trigger condition of action 1.

In this case, since the dependency condition is generated according to the action 1 determined by the target resource window, it may be understood that there must be action resources in the server that perform other operations for the window. Therefore, only another target resource, that is, the purifier, may be selected to create a corresponding action resource for an accompanying action.

As shown in FIG. 5E, the accompanying action resource may be action 4. Action 4 may be used to turn off the purifier when the haze parameter being less than or equal to the threshold D (D is less than or equal to C) is satisfied.

Figure 5F:
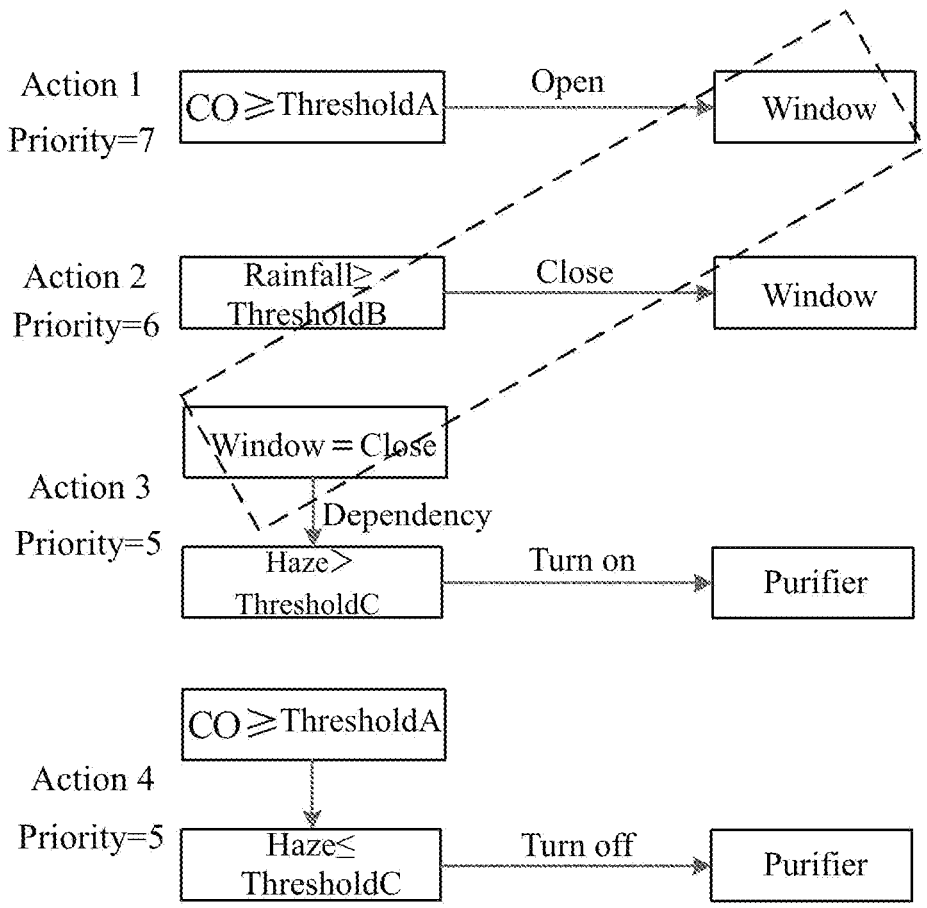
FIG. 5F shows yet another schematic example of creating action resources according to the embodiments of the present disclosure.

FIG. 5F shows yet another schematic example of creating action resources according to the embodiments of the present disclosure. Action resources for action 1 and action 2 shown in FIG. 5F are the same as the action resources for action 1 and action 2 shown in FIG. 5A, which will not be repeatedly described herein.

As shown in FIG. 5F, action 3 may be used to turn on the purifier when the haze parameter is greater than the threshold C. In addition, action 3 also has a dependency condition (window-closed), that is, to perform the opening operation for the purifier, the two conditions that the window is closed and the haze parameter is greater than threshold C must be satisfied at the same time.

A difference between the dependency condition in FIG. 5F and the dependency condition in FIG. 5E is that, the dependency condition in FIG. 5E is generated according to the action resources in the server, while the dependency condition in FIG. 5F is generated by the application device when creating action resources and transmitted to the server together with the creation request for the action resources.

In the action 3 shown in FIG. 5F, it should be understood that the purifier is turned on only when the two conditions that the window is closed and the haze parameter is greater than the threshold C are satisfied at the same time. However, if there is no other action resource for performing the turning off operation for the purifier, but there are other action resources for performing the opening operation for the window, it may happen that the window is opened after the purifier is turned on. This will lead to reduced usage effect of the purifier, which is an undesirable usage state of the application device.

In order to control the occurrence of the above-mentioned undesirable usage scenarios, it may be considered to create an accompanying action of action 3 according to the dependency condition of action 3.

As shown in FIG. 5F, action 1 capable of performing the opening operation for the window may be determined in the server, where the window is opened when the carbon monoxide content is greater than the threshold A. Therefore, the trigger condition of action 1 may be determined as the trigger condition or dependency condition of the accompanying action of action 3 (action 4). In other words, an action resource may be created so that the purifier is turned off when the carbon monoxide content is greater than the threshold A, thereby avoiding the situation that the window is opened again after the purifier is turned on.

As shown in FIG. 5F, an example of action 4 is to determine the carbon monoxide content being greater than the threshold A as the dependency condition of action 4, and the haze parameter being less than or equal to the threshold C (or less than or equal to the threshold D, where D is less than or equal to C) as the trigger condition of action 4. When the two conditions that the carbon monoxide content is greater than the threshold A and the haze parameter is less than or equal to the threshold C are satisfied at the same time, the purifier may be turned off.

In another example, an action resource may also be created so that action 4 is used to turn off the purifier when the carbon monoxide content is greater than the threshold A.

Figure 6:
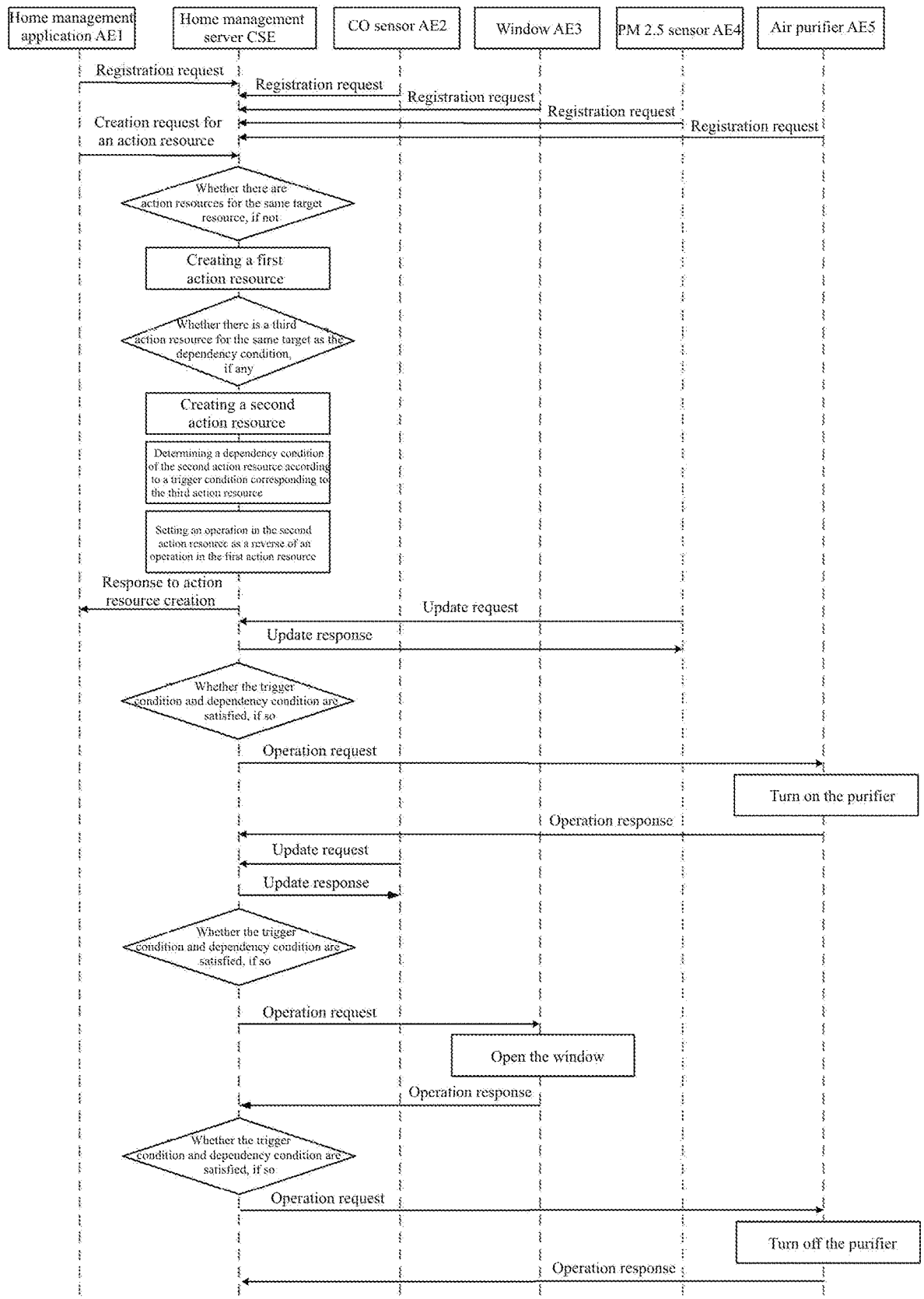
FIG. 6 shows a schematic example of creating action resources according to the embodiments of the present disclosure.

FIG. 6 shows a schematic example of creating action resources according to the embodiments of the present disclosure. As shown in FIG. 6, a home management application AE1, a carbon monoxide sensor AE2, a window controller AE3, a PM 2.5 sensor AE4, and an air purifier AE5 are registered to a home management server CSE, respectively.

The home management application AE1 may transmit a creation request for a first action resource (<action>) to the server CSE, where the creation request includes an action trigger subject (the PM 2.5 sensor AE4), a target resource (the purifier), a trigger condition (the haze parameter is greater than the threshold C), a dependency condition (the window is closed), and a control action (opening).

According to the creation request transmitted by the home management application AE1, the server CSE may create the first action resource. In some embodiments, before creating the first action resource, whether there are other action resources for the same target resource in the server may be judged. In the case that there is no other action resource for the same target resource, the first action resource may be created according to the creation request transmitted by the home management application AE1.

Then, the server CSE may create a second action resource according to the created first action resource. The second action resource may be used to trigger the operation for the purifier when the haze parameter is less than or equal to the threshold C.

As shown in FIG. 6, the server CSE may judge whether there is a third action resource for the same target (the window) as the dependency condition. If any, the dependency condition of the second action resource may be determined according to a trigger condition corresponding to the third action resource. For example, the third action resource may be used to trigger the opening operation for the window when the carbon monoxide content is greater than the threshold A. In this case, the trigger condition of the third action resource (the carbon monoxide content is greater than the threshold A) may be determined as the dependency condition of the second action resource.

Further, the operation performed for the purifier in the second action resource may be set to be a reverse of the operation performed for the purifier in the first action resource. That is, in the case that the first action resource is used to turn on the purifier, the second action resource may be used to perform the turning off operation for the purifier.

After creating the first action resource and the second action resource, the server CSE may transmit a response of successfully creating the action resources to the home management application AE1.

The server CSE may receive an update request from the PM 2.5 sensor AE4 to update the corresponding subject resource. The update request includes PM 2.5 data currently detected by the PM 2.5 sensor. In some embodiments, such update request may be transmitted periodically at a preset frequency, or may be transmitted in response to changes in detected data. For example, the update request may be transmitted to the server CSE when it is determined that the detected data is higher than a preset threshold. The server CSE may transmit a corresponding update response to AE4 after receiving the update request transmitted by AE4.

Then, the server CSE may judge whether the trigger condition and the dependency condition of the first action resource are satisfied according to the PM 2.5 data in the updated subject resource. If it is judged that the trigger condition and the dependency condition of the first action resource are satisfied, an action request may be transmitted to the air purifier. The air purifier may be turned on according to the received action request. After the turning on operation is performed, the air purifier AE5 may transmit an action response to the server CSE.

The server CSE may also receive an update request from the CO sensor (AE2) to update the corresponding subject resource. The update request may include data of the carbon monoxide content currently detected by the CO sensor. The server CSE may transmit a corresponding update response to AE2 after receiving the update request transmitted by AE2.

Then, the server CSE may judge whether the data received from the CO sensor satisfies the trigger condition and the dependency condition of the third action resource. If it is judged that the trigger condition and the dependency condition of the third action resource are satisfied, the server CSE may transmit an action request to the window controller and notify the window controller to perform an operation of opening the window. After the opening operation is performed, the window controller may transmit an action response to the server CSE.

After receiving the action response indicating that the window has been opened, the server CSE may further judge whether the update data transmitted by the CO sensor and the update data transmitted by the PM 2.5 sensor satisfy the trigger condition and the dependency condition of the second action resource. In the case where it is judged that the trigger condition and the dependency condition of the second action resource are satisfied, that is, the carbon monoxide content is greater than the threshold A and the haze parameter is less than or equal to the threshold C, the server CSE may transmit an action request to the air purifier to turn off the purifier. The air purifier may perform the turning off operation in response to the action request transmitted by the server CSE, and transmit an action response to the server CSE after turning off the air purifier.

Figure 7:
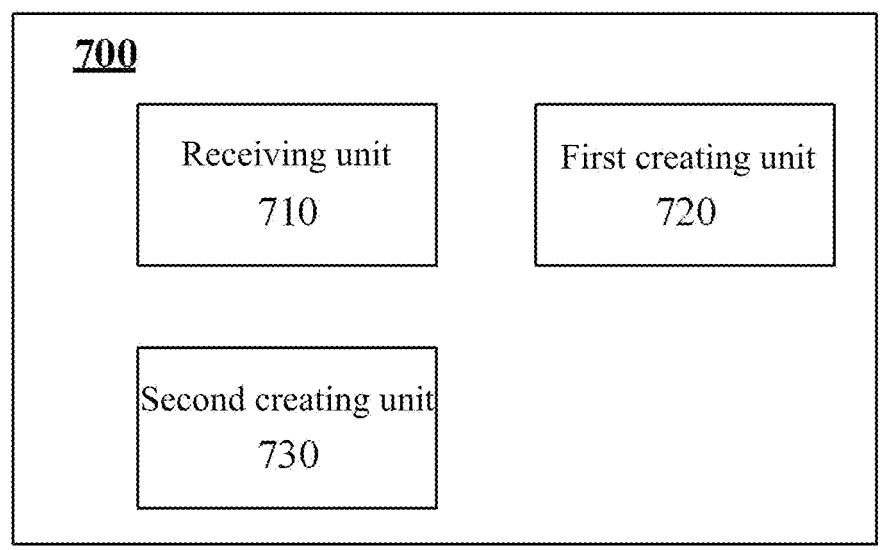
FIG. 7 shows a schematic block diagram of an apparatus for creating action in resources performed by the common service entity according to the embodiments of the present disclosure.

FIG. 7 shows a schematic block diagram of an apparatus for creating action resources performed by a common service entity according to the embodiments of the present disclosure.

As shown in FIG. 7, the apparatus 700 may include a receiving unit 710, a first creating unit 720, and a second creating unit 730.

The receiving unit 710 may be configured to receive a creation request for a first action resource, where the creation request includes a first target resource and a first criterion, and the first criterion is used to trigger a first operation for the first target resource according to a first condition. The first condition may be that a value of an environment variable is greater than a first threshold. The value of the environment variable may be a parameter value related to the surrounding environment detected by the application entity, such as a concentration of a certain gas (such as carbon monoxide) in the air, a haze parameter (such as particle concentration, etc.), temperature, humidity and other parameter values.

The first action resource may be a resource used to implement a first action. For example, when an application program wants to deploy an action on the service platform, it may transmit a creation request for an action resource to the service platform. For example, the home management application may deploy such an action on the home management server: when the concentration of carbon monoxide in the air is detected to be higher than a threshold A, an opening operation is performed for the window. The concentration of carbon monoxide in the air may be detected by a carbon monoxide sensor registered to the service platform, and the opening operation for the window may be performed by a window controller registered to the service platform.

The first creating unit 720 may be configured to create the first action resource according to the first criterion and the first target resource. With the created first action resource, it is possible to perform a predefined operation for the first target resource when the trigger condition is satisfied.

In some embodiments, the first criterion is further used to trigger a third operation for a second target resource according to the first condition. That is, the first action resource may include a plurality of target resources, and the predefined operation may be performed for each of the plurality of target resources when the trigger condition is satisfied.

In some embodiments, the first action resource further includes a dependency condition for the first action resource, and the first criterion is also used to perform the third operation for the second target resource in of the case that both the first condition and the dependency condition are satisfied. The dependency condition may be determined according to trigger conditions of other action resources for the same second target resource.

The second creating unit 730 may be configured to create a second action resource, where the second action resource includes the first target resource and a second criterion, the second criterion is used to trigger a second operation for the first target resource according to a second condition, and the second operation is different from the first operation.

In some embodiments, the second operation may be a reverse of the first operation. For example, when the first operation is to perform an opening operation for the target resource (for example, opening the window, turning on the purifier), the second operation may be to perform a closing operation for the target resource.

In other embodiments, the second operation may also be any other operation different from the first operation. For example, when the first operation is to set the temperature of the air conditioner to 25° C., the second operation may be to set the temperature of the air conditioner to 18° C.

In some embodiments, the second condition may be different from the first condition. When the first condition is that the value of the environment variable is greater than the first threshold, the second condition may be that the value of the environment variable is less than or equal to the first threshold. For example, when the first action resource is used to turn on the purifier when the haze parameter is greater than a threshold C, the second condition may be set as the haze parameter being less than or equal to the threshold C. When the first condition is that the value of the environmental variable is greater than the first threshold, the second condition may also be that the value of the environmental variable is less than or equal to a second threshold, where the second threshold is less than the first threshold. In another example, the second condition may also be set as the haze parameter being less than or equal to a threshold D, where the threshold D is less than or equal to the threshold C. The second action resource may be used to turn off the purifier when the second condition is satisfied.

In some embodiments, the second creating unit 730 may be configured to create the second action resource in the case that the common service entity does not include the action resource for the first target resource before the first action resource is created. For example, when the first action resource is used to turn on the purifier in the case that the haze parameter is greater than the threshold C, whether there are other action resources for performing operations for the purifier may be judged. In the case that there are other action resources for performing operations for the purifier before the first action resource is created, the second action resource may not be created. In the case that there is no other action resource for performing operation for the purifier before the first action resource is created, the second action resource may be created.

Further, the second creating unit 730 may be configured to create the second action resource in the case that the common service entity does not include the action resource that triggers the second operation for the first target resource before the first action resource is created. For example, when the first action resource is used to turn on the purifier in the case that the haze parameter is greater than the threshold C, whether there are other action resources for performing the turning off operation for the purifier may be judged. In the case that there are other action resources for performing operations for the purifier, it is also necessary to further judge whether the other resources for performing operations for the purifier are all action resources for turning on the purifier. If there are only action resources for turning on the purifier, and no other action resource for performing turning off operation for the purifier, a second action resource may be created.

In some embodiments, the third operation performed for the second target resource may be an auxiliary operation of the first operation. In other words, performing the third operation for the second target resource helps the first operation to achieve its due effect. In this case, the second action resource may be created only for the first target resource.

In other embodiments, when the first action resource involves operations for a plurality of target resources, the second action resource may be created to perform other operations that are different from the operations defined in the first action resource for each target resource. For example, the second criterion may further be used to trigger a fourth operation for the second target resource according to the second condition, where the fourth operation is a reverse of the third operation.

In some embodiments, when the first action resource further includes the dependency condition, that is, the first criterion is also used to perform the first operation for the first target resource in the case that both the first condition and the dependency condition are satisfied, the second creating unit 730 may be further configured to: determine the second target resource associated with the dependency condition, and determine a third action resource based on the second target resource, the third action resource being used to perform a fifth operation for the second target resource in the case that a third condition is satisfied; and create the second action resource based on the third condition, where the third condition is determined as a dependency condition of the second condition.

That is, in the presence of the dependency condition, new action resources may be created according to action resources involved in the target resources related to the dependency condition.

Further, the second creating unit 730 may also be configured to set a priority of the second action resource according to a priority of the first action resource, where the priority of the second action resource may be higher than, equal to, or lower than the priority of the first action resource.

With the apparatus for creating action resources provided in this application, new action resources for the same target resource may be created according to trigger conditions of the created action resources, thereby realizing an intelligent creation of actions for the target resource, reducing the user's workload when setting up an action service of the application device, and improving the user's experience.

The embodiments of the present application may also be implemented as an electronic device. The electronic device according to the embodiments of the present application includes a memory and a processor, where the memory has instructions stored thereon, which, when performed by the processor, cause the processor to perform the method according to the embodiments of the present application described with reference to the above accompanying drawings.

A computer-readable storage medium according to the embodiments of the present application stores computer-readable instructions. When the computer-readable instructions are executed by the processor, the method according to the embodiments of the present application described with reference to the above accompanying drawings may be performed.

One computer-readable medium may take many forms, including tangible storage media, carrier wave media, or physical transmission media, and so on. Stable storage media may include: optical disks or magnetic disks, and other storage systems used in computers or similar devices that may implement the system components described in the drawings. Unstable storage media may include dynamic memories, for example, a main memory of a computer platform. Tangible transmission media may include coaxial cables, copper cables, and optical fibers, for example, lines that form a bus inside the computer system. Carrier wave transmission media may transmit electric signals, electromagnetic signals, acoustic wave signals, or light wave signals, and so on. These signals may be generated by radio frequency or infrared data communication methods. Common computer readable media include hard disks, floppy disks, magnetic tapes, and any other magnetic media; CD-ROMs, DVDs, DVD-ROMs, and any other optical media; punch cards, and any other physical storage media containing small hole patterns; RAMs, PROMs, EPROMS, FLASH-EPROMs, and any other memory chips or tapes; carrier waves, cables for transmitting data or instructions, or connecting apparatuses for transmitting carrier waves, and any other program codes and/or data that may be read by computers. Many of these forms of computer-readable media may appear in the processes of the processor performing instructions and delivering one or more results.

The "module" in this application refers to logic or a set of software instructions stored in hardware or firmware. The "module" referred to herein may be performed by software and/or hardware modules, or stored in any non-transitory computer-readable medium or other storage devices. In some embodiments, one software module may be compiled and linked into one executable program. Obviously, the software module herein may respond to information delivered by itself or other modules, and/or may respond when certain events or interrupts are detected. The software module may be provided on one computer-readable medium, and the software module may be configured to perform operations on the computing device (for example, the processor 220). The computer-readable medium herein may be an optical disc, a digital optical disc, a flash disk, a magnetic disk, or any other kind of tangible medium. The software module may also be obtained by way of digital download (the digital download herein also includes data stored in a compressed package or an installation package, which needs to be decompressed or decoded before execution). Codes of the software module herein may be partially or completely stored in the storage device of the computing device that performs operations, and used in the operations of the computing device. Software instructions may be embedded in firmware, for example, an erasable programmable read-only memory (EPROM). Obviously, the hardware module may include logic units connected together, for example, gates, triggers, and/or including programmable units, such as, programmable gate arrays or processors. Functions of the modules or the computing device described herein are preferably implemented as software modules, but may also be expressed in hardware or firmware. In general, the modules described herein are logical modules and are not limited by their specific physical form or memory. One module may be combined with other modules, or divided into a series of sub-modules.

All or a part of the software may sometimes communicate through a network, such as the Internet or other communication networks. Such communication may load software from one computer device or processor to another, for example, loading from a server or host computer of an Internet of Things communication system to a hardware platform of a computer environment, or other computer environments realizing the system, or a system with similar functions related to providing information required by the Internet of Things communication system. Therefore, another medium that may transmit software elements may also be used as a physical connection between local devices, such as light waves, electric waves, electromagnetic waves, etc., to achieve propagation through cables, optical cables, or air, etc. Physical media used for carrying waves, such as cables, wireless connections, optical cables and the like, may also be considered as media that carry software. All other terms as used herein indicating computer or machine "readable medium" refer to a medium that participates in execution of any instruction by the processor, unless a tangible "storage" medium is limited.

Unless otherwise defined, all terms (including technical and scientific terms) as used herein have the same meanings as commonly understood by those of ordinary skill in the art to which the present disclosure belongs. It should also be understood that terms such as those defined in ordinary dictionaries should be interpreted as having meanings consistent with those in the context of related technologies, and should not be interpreted in idealized or extremely formalized meanings, unless explicitly defined as such herein.

The above is an illustration of the present disclosure and should not be considered as a limitation thereof. Although several exemplary embodiments of the present disclosure have been described, those skilled in the art will readily understand that many modifications may be made to the exemplary embodiments without departing from the novel teachings and advantages of the present disclosure. Therefore, all these modifications are intended to be included in the scope of the present disclosure defined by the claims. It should be understood that the above is an illustration of the present disclosure, and should not be considered as being limited to the disclosed specific embodiments, and modifications to the disclosed embodiments and other embodiments are intended to be included in the scope of the appended claims. The present disclosure is defined by the claims and their equivalents.

What is claimed is:

1. A method for controlling smart home devices performed by a server in Internet of Things, comprising:
   receiving, by the server, a creation request for a first action resource from an application device in the Internet of Things, wherein the creation request includes a first target resource for a first smart home device, a second target resource for a second smart home device and a first criterion, the first criterion being used to trigger, by the server, a first operation for the first target resource and a second operation for the second target resource according to a first condition;
   determining, by the server, a third action resource having higher priority based on the first target resource, wherein the third action resource is used to perform a third operation for the first target resource in a case that a third condition is satisfied, and the third operation is a reverse of the first operation;
   creating, by the server and in response to the creation request, the first action resource according to the first criterion, the first target resource and the second target resource, wherein the first action resource uses a reverse of the third condition as a dependency condition; and
   creating, by the server, a second action resource in response to creation of the first action resource without receiving a creation request for the second action resource, wherein the second action resource includes the second target resource and a second criterion, the second criterion being used to trigger, by the server, a fourth operation for the second target resource according to a second condition, and wherein the fourth operation is a reverse of the second operation,
   the method further comprising: controlling, by the server, the first smart home device to automatically perform the first operation and the second smart home device to automatically perform the second operation if both the first condition and the dependency condition are satisfied.

2. The method according to claim 1, wherein the first condition and the second condition are different.

3. The method according to claim 1, wherein the first condition is that a value of an environment variable is greater than a first threshold, and the second condition is that the value of the environment variable is less than or equal to the first threshold.

4. The method according to claim 1, wherein the first condition is that a value of an environment variable is greater than a first threshold, and the second condition is that the value of the environment variable is less than or equal to a second threshold, wherein the second threshold is less than the first threshold.

5. The method according to claim 1, wherein the creating a second action resource includes:
   creating the second action resource in a case that there is no action resource for the second target resource before the first action resource is created.

6. The method according to claim 1, wherein the creating a second action resource includes:
   creating the second action resource in a case that there is no action resource that triggers the fourth operation for the second target resource before the first action resource is created.

7. A server in Internet of Things for controlling smart home devices, comprising at least one processor configured to:
   receive a creation request for a first action resource from an application device in the Internet of Things, wherein the creation request includes a first target resource for a first smart home device, a second target resource for a second smart home device and a first criterion, the first criterion being used to trigger, by the server, a first operation for the first target resource and a second operation for the second target resource according to a first condition;
   determine a third action resource having higher priority based on the first target resource, wherein the third action resource is used to perform a third operation for the first target resource in a case that a third condition is satisfied, and the third operation is a reverse of the first operation;
   create, in response to the creation request, the first action resource according to the first criterion, the first target resource and the second target resource, wherein the first action resource uses a reverse of the third condition as a dependency condition; and
   create a second action resource in response to creation of the first action resource without receiving a creation request for the second action resource, wherein the second action resource includes the second target resource and a second criterion, the second criterion being used to trigger, by the server, a fourth operation for the second target resource according to a second condition, and wherein the fourth operation is a reverse of the second operation,
   wherein the at least one processor is configured to control the first smart home device to automatically perform the first operation and the second smart home device to automatically perform the second operation if both the first condition and the dependency condition are satisfied.

8. An electronic device comprising a memory and a processor, wherein the memory has instructions stored thereon, which, when performed by the processor, cause the processor to perform the method according to claim 1.

9. The apparatus according to claim 7, wherein the first condition and the second condition are different.

10. The apparatus according to claim 7, wherein the first condition is that a value of an environment variable is greater than a first threshold, and the second condition is that the value of the environment variable is less than or equal to the first threshold.

11. The apparatus according to claim 7, wherein the first condition is that a value of an environment variable is greater than a first threshold, and the second condition is that the value of the environment variable is less than or equal to a second threshold, wherein the second threshold is less than the first threshold.

12. The apparatus according to claim 7, wherein the at least one processor is further configured to create the second action resource in a case that there is no action resource for the second target resource before the first action resource is created.

13. The apparatus according to claim 7, wherein the at least one processor is further configured to create the second action resource in a case that there is no action resource that triggers the fourth operation for the second target resource before the first action resource is created.

* * * * *